US006895175B2

(12) United States Patent
Fulton et al.

(10) Patent No.: US 6,895,175 B2
(45) Date of Patent: May 17, 2005

(54) ELECTRICAL CONTROL CIRCUIT AND METHOD

(75) Inventors: David A. Fulton, Anderson, IN (US); Ralph H. Johnston, Anderson, IN (US)

(73) Assignee: Cummins, Inc., Columbus, IN (US)

( * ) Notice: Subject to any disclaimer, the term of this patent is extended or adjusted under 35 U.S.C. 154(b) by 191 days.

(21) Appl. No.: 09/965,791

(22) Filed: Oct. 1, 2001

(65) Prior Publication Data

US 2003/0063899 A1 Apr. 3, 2003

(51) Int. Cl.[7] .............................. G05F 1/10; H02P 5/06
(52) U.S. Cl. ....................... 388/806; 318/139; 318/430; 318/445; 388/800; 290/38 R; 123/179.1; 123/179.2; 123/179.25
(58) Field of Search ........................... 123/179.1, 179.2, 123/179.25; 290/31–38 R; 318/138, 139, 244, 245; 388/800–806

(56) References Cited

U.S. PATENT DOCUMENTS 3,594,029 A * 7/1971 Holt ............................ 290/36
4,122,354 A * 10/1978 Howland ..................... 290/31
4,188,931 A * 2/1980 Waterhouse ............ 123/179 B
4,380,724 A 4/1983 Franz, Jr. et al.
4,415,812 A * 11/1983 Griffith et al. ............ 290/38 R
4,551,630 A * 11/1985 Stahura et al. ............ 290/38 R
4,598,209 A * 7/1986 Garlinghouse ............ 290/38 C
4,656,404 A 4/1987 Klinchurch
4,862,009 A * 8/1989 King ........................... 290/22
5,160,875 A * 11/1992 Kono ......................... 318/280
5,622,148 A * 4/1997 Xue et al. .............. 123/179.25
5,723,956 A * 3/1998 King et al. ................. 318/139
5,880,565 A 3/1999 Watanabe
6,008,606 A * 12/1999 Arai et al. .................. 318/431
6,104,157 A * 8/2000 Kramer et al. .............. 318/445
6,281,646 B1 8/2001 Masberg et al.
6,651,603 B2 * 11/2003 Osada et al. ............. 123/179.3
6,681,736 B2 * 1/2004 Sumimoto et al. ....... 123/179.3
6,707,169 B2 * 3/2004 Shimizu et al. ........... 290/40 C
6,752,110 B2 * 6/2004 Tharman et al. ....... 123/179.18

* cited by examiner

*Primary Examiner*—David Martin
*Assistant Examiner*—Tyrone Smith
(74) *Attorney, Agent, or Firm*—Woodard, Emhardt, Moriarty, McNett & Henry LLP

(57) ABSTRACT

Systems, methods, and apparatus, consistent with principles of the present invention, allow an unmodified device, for example, a dc starter motor, that normally operates at a first voltage to function in an electrical system providing a second voltage, which is different from the first voltage, and received from the power source. A device actuator, such as a solenoid, is controlled using the second voltage. The first voltage is produced and supplied to the device in response to a first action of the actuator, for example, upon solenoid depression. This voltage is then inhibited from being provided to the device in response to a second action of the actuator, for example, upon solenoid retraction after engine cranking.

41 Claims, 3 Drawing Sheets

System 100

ELECTRICAL CONTROL CIRCUIT AND METHOD

DESCRIPTION OF THE INVENTION

1. Field of the Invention

The present invention generally relates to electrical adapters, and more specifically to a system, method, and apparatus for allowing an electrical device rated a particular voltage to operate in an electrical system providing a different voltage.

2. Description of the Related Art

Certain electrical devices such as starter motors for internal combustion engines are powered by single batteries or several series-connected batteries contained in battery packs. Batteries and battery packs are rated at various voltages depending on the intended application. Voltages such as 12, 24, 32, and 64 volts are common for use with starters. In order to economically accommodate varying voltage requirements, starter manufacturers typically use the same basic motor parts and change only the motor and solenoid windings of the starter. This can be accomplished provided the available power from the battery pack is roughly the same, despite the difference in system voltages. The available power is the maximum product of voltage and current over the operating range of the battery. For example, when an engine manufacturer buys starters for a truck engine that is used in both the U.S. and Europe, the manufacturer will need 12V and 24V starters as these are standard voltages for these markets. If the battery packs are designed to meet cranking requirements, the 12V and 24V packs will have roughly the same available power. In this case, the same basic starter can be used, with only the windings changed.

However, in certain applications, system voltage and available battery power are dictated by other requirements in addition to engine cranking. An example of such an additional requirement is the powering of an air-conditioning unit on a locomotive. In such cases, the system's battery pack is required to produce sufficient power and voltage to operate the air-conditioning unit and the starter. Consequently, the system power and voltage may be considerably higher than the voltage at which the starter is rated. When the system voltage is not a standard starter voltage and the available power of the battery pack is unusually high, it is difficult to adapt starters to the system.

One remedy used for obtaining a standard voltage from a battery pack providing a relatively high voltage is to "tap" the series-connected battery pack at some intermediate point. This will cause a subset of the available batteries in the pack to be cycled during engine cranking. However, this subset of batteries will typically cycle more often than the other batteries in the pack. Consequently, the subset may require more recharging than the remaining batteries in the pack and may have a shorter lifetime. A battery equalizer circuit can be employed to account for this unequal charging demand; however, this type of circuit is expensive. Further, an equalization circuit is unable to prevent the subset of batteries used for engine cranking from being cycled more often than the others.

Moreover, even if an intermediate tap is used to attain a standard voltage, the available power from any tapped subset may be too high to adapt the starter by changing only its windings. For a given system (open circuit) voltage, the available power is increased when the internal resistance of the battery pack is decreased. Therefore, an intermediate tap may not be effective if the battery pack has extremely low internal resistance. In such a case, a substantially new motor would have to be developed and customized for the application. However, developing customized motors for specific applications further entails providing customized engineering support and service parts, which may not be economically feasible.

SUMMARY OF THE INVENTION

Systems, methods, and apparatus, consistent with principles of the present invention, address the above and other problems by allowing an unmodified device, for example, a dc starter motor, that normally operates at a first voltage to function in an electrical system providing a second voltage, which is lower than the first voltage, and received from the power source. A device actuator, such as a solenoid, is controlled using the second voltage. The first voltage is produced and supplied to the device in response to a first action of the actuator, for example, upon solenoid depression. This voltage is then inhibited from being provided to the device in response to a second action of the actuator, for example, upon solenoid retraction after engine cranking.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification, illustrate one example of the invention and together with the description, serve to explain the principles of the invention.

DETAILED DESCRIPTION

Figure 1:
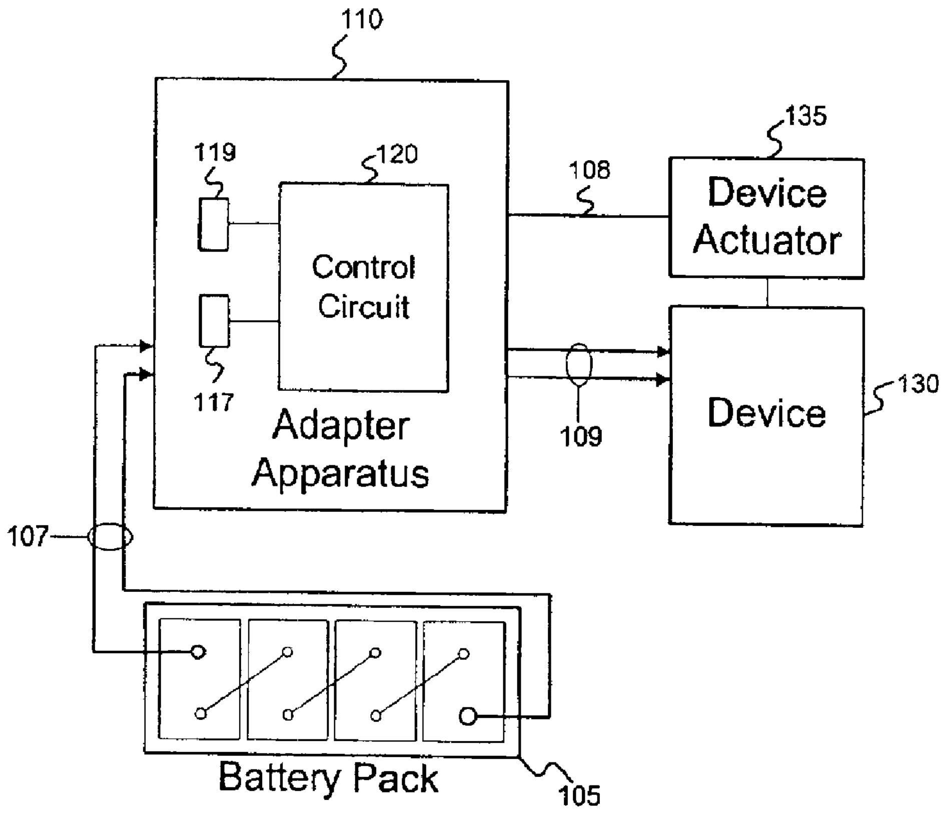
FIG. 1 is an exemplary block diagram of an electrical system, in accordance with principles of the present invention.

In the following detailed description reference will be made to the accompanying drawings in which is shown by way of illustration a specific embodiment in which the invention may be practiced. This example is described in sufficient detail to enable those skilled in the art to practice the invention and it is to be understood that other embodiments may be utilized and that structural changes may be made without departing from the scope of present invention. The following detailed description is, therefore, not to be construed in a limited sense.

Systems consistent with principles of the present invention may comprise a power source for producing a first voltage, a device to be operated at second voltage, a device actuator, and an adapter apparatus coupled to the power source, device, and actuator. An adapter apparatus consistent with the present invention may further comprise a control circuit for receiving the first voltage from the power source; controlling the action of the actuator using the first voltage; producing and supplying the second voltage to the device in response to a first action of the actuator; and inhibiting the second voltage from being supplied in response to a second action of the actuator.

A control circuit consistent with principles of the present invention may comprise a first relay activated by a switch closing; a second relay activated in response to the first relay's activation; and a direct current chopper module ("DCCM") coupled to the power source. The activation of the first and second relays causes a first action of the actuator (e.g., solenoid depression) which causes the dc chopper module to output the second voltage. The control circuit may also comprise a third relay, coupled to the second relay and the dc chopper module, which is activated when the dc chopper module is caused to output the second voltage. The activation of the third relay, in turn, deactivates the second relay. The switch opening deactivates the first relay. The deactivation of the first and second relays causes a second action of the actuator (e.g., solenoid retraction), which causes the DCCM to deactivate, thereby stopping the second voltage from being output.

Referring now to the drawings, in which like numerals represent like elements throughout the figures, the present invention will be described.

FIG. 1 is an exemplary block diagram of a system 100 in accordance with principles of the present invention. System 100 may comprise battery pack 105, device 130, device actuator 135, and adapter apparatus 110. Battery pack 105 may include a plurality of series-connected cells for producing electrical energy and may supply a direct current ("dc") voltage to adapter apparatus 110 via connection 107. Adapter apparatus 110 is in turn coupled to device 130 and device actuator 135 via connections 108 and 109, respectively. In one embodiment, device 130 is dc motor and device actuator 135 is a solenoid. As FIG. 1 illustrates, adapter apparatus 110 may further comprise, arming switch 117, starter switch 119, and control circuit 120. Control circuit 120 receives the voltage from battery pack 105, controls device actuator 135, and provides a voltage for operating device 130.

For the sake of brevity, it will be assumed that all of the connections and connection terminals depicted in the foregoing and following figures are physical mediums capable of transporting electric charge.

Figure 2:
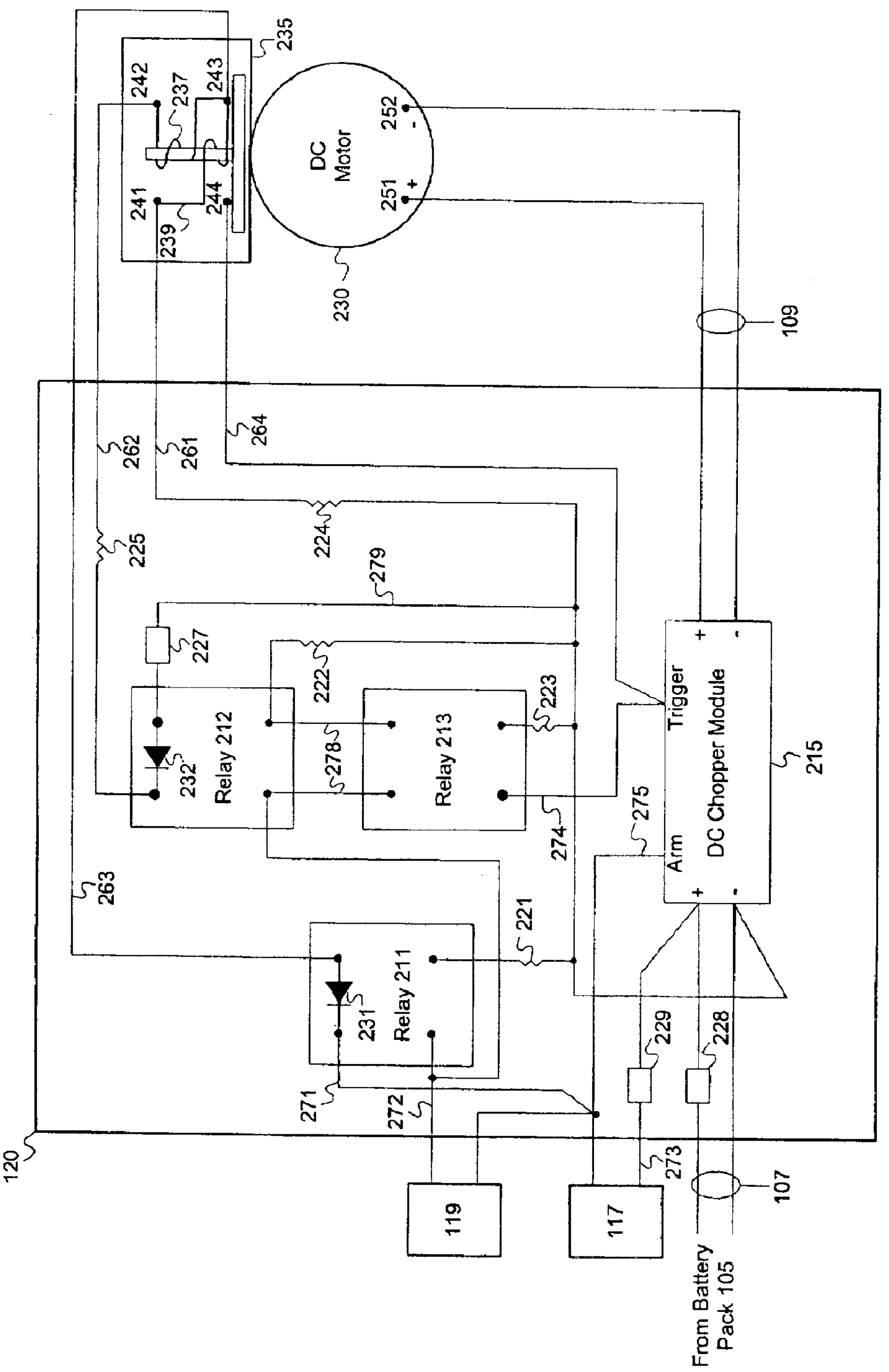
FIG. 2 is a detailed block diagram representative of an adapter apparatus depicted in the system of FIG. 1.

FIG. 2 is an exemplary block diagram of control circuit 120, and in accordance with principles of the present invention. Control circuit 120 may comprise relays 211, 212, and 213; and DCCM 215. Arming switch 117 and starter switch 119 may be connected to control circuit 120 as illustrated. Control circuit 120 may further comprise resistors 221, 222, and 223; slow blow fuse 227; fuses 228 and 229; and free-wheeling diodes 231 and 232. As FIG. 2 illustrates, the voltage produced by battery pack 105 is supplied to DCCM 215 via connection 107. DCCM 215 receives this voltage and, in turn, supplies another voltage to device 130, via connection 109, which allows device 130 to operate. In one embodiment, DCCM 215 produces a pulse width modulated voltage. In operation, DCCM 215 is triggered to output voltage in response to actuator 135. An example of a DCCM 215 is the Zapi Model H3D 800A 120V controller for dc motor.

In one example of the invention, as illustrated in FIG. 2, control circuit 120 is coupled to a dc motor 230 and a solenoid actuator 235, which serve as a starter motor assembly. Solenoid actuator 235 may further comprise pull-in ("PI") coil 237, hold-in ("HI") coil 239, and connection terminals 241, 242, 243, and 244. Similarly, dc motor 230 may comprise connection terminals 251 and 252. In this embodiment, connection 108 comprises connections 261, 262, 263, and 264 for connecting to terminals 241–244. One example of a starter motor assembly is the Delco Remy 50MT. Control circuit 120 may include resistor 224, which is connected to a ground provided by DCCM 215 and to HI coil 239 of solenoid 235, via terminal 241 and connection 261. Control circuit 120 may also include resistor 225, which is connected to the power side of relay 212 and PI coil 237 of the solenoid, via terminal 242 and connection 262. Resistors 224 and 225 form a voltage divider and are used to limit the current in these solenoid coils. Solenoid actuator 235 may also be connected to relay 211 via terminal 243 and connection 263 and may be connected to DCCM 215 via terminal 244 and connection 264. Motor 230 receives the voltage it requires from DCCM 215 via terminals 251 and 252 and connection 109. DCCM 215 provides this voltage in response to an action of actuator device 135 (e.g., solenoid 235's depressing). The action of actuator device 135, which triggers DCCM 215, is controlled by circuit 120 and essentially by relays 211, 212, and 213.

Relays 211, 212, and 213 may be solid-state relays, each having a control side and a power side. However, it should be understood that mechanical relays or any other switching devices responsive to current and voltage change and capable of switching inductive loads may be employed. An example of a solid-state relay is Magnecraft Solid-State Relay 200V 40A Part# W6240DDX-1. As illustrated in FIG. 2, resistors 221, 222, and 223 are connected between a ground provided by DCCM 215 and the control sides of relays 211, 212, and 213, respectively. The values of these resistances are chosen to keep the control voltages within the operating limits of the relays. As FIG. 2 also illustrates, control circuit 120 may also include free-wheeling diodes 231 and 232 connected across the power sides of relays 211 and 212, respectively. These diodes are used to prevent voltage spikes due to the switching of the inductive loads in solenoid 235.

Slow-blow fuse 227 is coupled between the power side of relay 212 and a ground provided by DCCM 215. Fuse 228 is coupled to DCCM 215 and the positive terminal of battery pack 105. Similarly, fuse 229 is coupled DCCM 215 and to arming switch 117. Arming switch 117 may include, but is not limited to a key-type switch. Starter switch 119 may include, but is not limited to a button-type switch. Moreover, in another embodiment, arming switch 117 may be replaced by a permanent connection.

Figure 3:
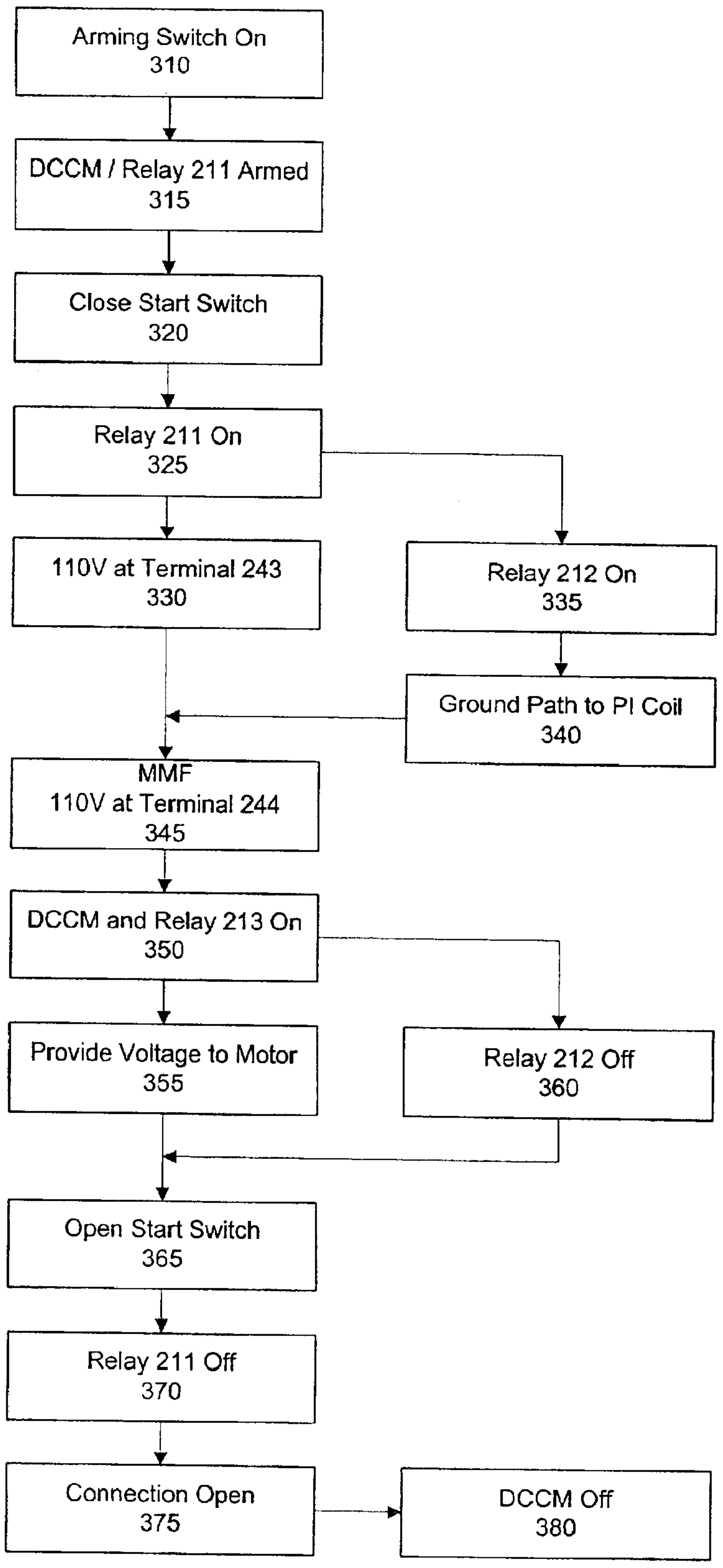
FIG. 3 is a flow chart depicting the operation of an adapter apparatus, in accordance with principles of the present invention.

Referring now to FIG. 3, a detailed flowchart depicting the operation of the present invention will be described. For purposes of this explanation, it will be assumed that device 130 is dc motor 230 rated at 64V, device actuator 135 is solenoid actuator 235 (such as the Delco Remy 50MT mentioned above), and battery pack 105 produces 110V. However, it should be understood that dc motor 230 may be rated at voltages above and below 64V, and battery pack 105 may produce voltages above and below 110V. Further, device 130 is not constrained to be a dc motor and device actuator is not constrained to be a solenoid.

As indicated by step 310, arming switch 117 is turned to the on position. This arms DCCM 215 via connection 275 and the power side of relay 211 via connection 271, indicated in step 315. Closing starter switch 119 (step 320) activates relay 211 (step 325), via connection 272. As step 330 indicates, the activation of relay 211 applies 110V to terminal 243 of solenoid 235 via connection 263. Simultaneously, relay 212 is activated in response to relay 211 (step 335). When relay 212 is on, a ground path is provided for the PI coil of the solenoid via terminal 242, connection 262, and connection 279, indicated in step 340. HI coil 239 is grounded via connection 261 and remains energized as long as relay 211 is on. As indicated by step 345, a magneto-motive force ("MMF") is produced by the energization of PI coil 237 and HI coil 239 of solenoid 235. The MMF causes a connection between terminals 243 and 244. This connection applies 110V to terminal 244, thereby triggering DCCM 215 via connection 264 and activating relay 213 via connection 274, as indicated by step 350. As previously indicated, when triggered, DCCM 215 outputs a voltage necessary to operate device 130, and this voltage may be pulse-width modulated. As indicated in step 355, this voltage is provided to dc motor 230 via connection 109 and terminals 251 and 252.

The activation of relay 213 short circuits the control side of relay 212 via connection 278, thereby turning relay 212 off. Turning off relay 212 opens the ground path provided by connections 262 and 279 to PI coil 237 (step 360). When starter switch 119 is opened (step 365), relay 211 is deactivated and HI coil 239 is de-energized (step 370). This causes the connection between terminals 243 and 244 to open (step 375), thereby inhibiting the output produced by DCCM 215, indicated by step 380.

In operation, adapter apparatus 110 allows device 130 to function using the voltage supplied by the battery pack and essentially the same as it would with a battery pack supplying a voltage consistent with its rating and without the adapter apparatus. For example, adapter apparatus 110 ensures that solenoid force and ohmic heating are unchanged; PI coil 237 is de-energized during cranking; and that the crank speed and ohmic heating of motor 230 are unchanged. Further, slow-blow fuse 227, which is used in the ground path provided to PI coil 237, protects the PI coil from damage in the event that the pinion gear fails to engage the ring gear and the starter switch is closed for an excessive period of time (for example, greater than 5 seconds). Moreover, it should be understood that the output of DCCM 215 may not necessarily be the voltage at which device 130 is rated. For example, the above-described motor may be rated at 64V, yet operate at a slightly lower voltage, since the nominal battery application drops its available voltage with motor current draw due to internal resistance of the battery pack. Hence, the output from DCCM 215 will be the voltage at which the particular device operates. For example, approximately 50V for the Delco Remy 50MT. It should also be understood that, in operation, the average output voltage of DCCM 215 remains essentially constant with current draw up to a pre-set limit. Further, the duty cycle of the DCCM 215 output may be set to match the cranking speed of motor 230 for a nominal battery application.

It should be understood that processes described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

It will be apparent to those skilled in the art that various modifications and variations can be made in the systems, methods and apparatus of the present invention and in the construction of this invention without departing from the scope of or spirit of the invention. For example, DCCM 215 can be either a low-side or high-side switching module and, if a low-side switching module is employed, an additional relay may be placed between DCCM 215 and device 130 to prevent having a voltage applied to terminal 251 when the starter motor is not in use.

The present invention has been described in relation to a particular example which is intended in all respects to be illustrative rather than restrictive. Those skilled in the art will appreciate that many different combinations of hardware will be suitable for practicing the present invention.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrical system comprising:

a power source providing a first voltage;

a device that operates at a second voltage that is lower than the first voltage;

an actuator for actuating the device;

a control circuit coupled to the power source, the actuator, and the device, for:

receiving the first voltage from the power source;

controlling the operation of the actuator using the first voltage;

producing the second voltage, and providing the second voltage to the device in response to the operation of the actuator.

2. The system of claim 1, wherein the device is a dc motor for cranking an engine and the actuator is a solenoid and wherein the providing of the second voltage is stopped after the engine is cranked.

3. The system of claim 1, wherein the power source provides 110V and the device is rated at 64V.

4. The system of claim 1, wherein the control circuit produces and provides a pulse width modulated second voltage.

5. The system of claim 1, wherein the second voltage is approximately 50V.

6. The system of claim 1, wherein the control circuit includes a dc chopper module for producing the second voltage.

7. The system of claim 1, wherein the operation of the actuator is controlled by solid state relays.

8. An electrical adapter apparatus for allowing a device that operates at a first voltage to function without modification in an electrical system providing a second voltage, the device having an actuator, the apparatus comprising a switch and a control circuit, the control circuit:

receives the second voltage from the electrical system;

causes the actuator to actuate the device using the second voltage in response to the switch closing;

produces the first voltage, wherein the first voltage is lower than the second voltage;

provides the first voltage to the device after the actuation of the device; and inhibits the first voltage from being provided in response to the switch opening.

9. The apparatus of claim 8, wherein the device is a dc motor and the actuator is a solenoid.

10. The apparatus of claim 8, wherein the control circuit produces a pulse width modulated first voltage.

11. The apparatus of claim 8, wherein the switch is opened and closed by an operator of the apparatus.

12. The apparatus of claim 8, wherein the second voltage is 110V and the device is rated at 64V.

13. The apparatus of claim 8, wherein the first voltage is approximately 50V.

14. A method for allowing a device to be operated at a first voltage to function with a power source providing a second voltage, the first and second voltage being different, the device having an actuator, and the method comprising:

receiving the second voltage from the power source;

controlling the actuator using the second voltage;

producing the first voltage, wherein the first voltage is lower than the second voltage;

providing the first voltage to the device in response to a first action of the actuator; and inhibiting the first voltage from being provided to the device in response to a second action of the actuator.

15. The method of claim 14, wherein the actuator is a solenoid and the second voltage is provided to a starter motor.

16. The method of claim 14, wherein producing the first voltage includes producing a pulse width modulated voltage.

17. The method of claim 14, wherein inhibiting the first voltage is performed in response to a switch opening.

18. The method of claim 14, wherein the device is rated at 64V and the receiving step includes receiving 110V from the power source.

19. The method of claim 14, wherein the first voltage is approximately 50V.

20. An electrical adapter apparatus for use with a power source providing a first voltage, the adapter apparatus outputting a second voltage lower than the first voltage, the adapter apparatus comprising:

a first relay activated by a switch closing;

a second relay activated in response to the first relay's activation;

a dc chopper module coupled to the power source, wherein the activation of the first and second relays causes the dc chopper module to output the second voltage;

a third relay, coupled to the second relay and the dc chopper module, activated when the dc chopper module is caused to output the second voltage, wherein the activation of the third relay deactivates the second relay, and wherein the first relay is deactivated by the switch opening, the deactivation of the first and second relays causing the dc chopper module to deactivate, thereby stopping the second voltage from being output.

21. The electrical adapter apparatus of claim 20, wherein the apparatus is coupled to a solenoid and dc motor, and wherein a first terminal of the solenoid is coupled to the first relay, the terminal receiving the first voltage when the first relay is activated;

a pull-in coil of the solenoid is coupled to the second relay, wherein the activation of the second relay provides a ground path to said coil;

a hold-in coil of the solenoid is coupled to a ground;

a second terminal of the solenoid is coupled to the dc chopper module; and the dc motor is coupled to the dc chopper module and receives the second voltage, wherein the activation of the first and second relays causes an electrical connection between the first and second terminals, thereby applying the first voltage to the dc chopper module and causing the second voltage to be output, and wherein the deactivation of the first and second relays causes the connection to break, thereby deactivating the dc chopper and inhibiting the second voltage.

22. The electrical adapter apparatus of claim 20, wherein the power source provides 110V.

23. The electrical adapter apparatus of claim 21, wherein the dc motor is rated at 64V and operates at approximately 50V.

24. The electrical adapter apparatus of claim 20, wherein the dc chopper module provides a pulse width modulated voltage.

25. The electrical adapter apparatus of claim 20 further comprising first, second and third resistors coupled between a ground and the first, second, and third relays, respectively.

26. The electrical adapter apparatus of claim 20 further comprising a slow blow fuse coupled between the second relay and a ground.

27. The electrical adapter apparatus of claim 20, wherein the dc chopper module is coupled through a fuse to the power source.

28. The electrical adapter apparatus of claim 20 further comprising a switch for arming the first relay and the dc chopper module, wherein the dc chopper module is coupled to the switch through a fuse.

29. The electrical adapter apparatus of claim 20 further comprising first and second free-wheeling diodes coupled to the first and second relays, respectively, for preventing voltage spikes.

30. The electrical adapter apparatus of claim 20, wherein the relays are solid-state relays.

31. The electrical adapter apparatus of claim 20, wherein the second voltage is approximately 50V.

32. A control circuit for use with a power source providing a first voltage, the control circuit proving a second voltage different from the first voltage, the control circuit comprising:

a first relay activated by a switch closing;

a second relay activated by the first relay;

a dc chopper module coupled to the power source, said module proving the second voltage when activated;

a third relay coupled to the second relay; and a control line coupled to the third relay and the dc chopper module for activating the third relay and the dc chopper module, wherein the activation of the first and second relays causes the first voltage to be applied to the control line, thereby activating the dc chopper module and the third relay, and wherein the third relay deactivates the second relay and opening the switch deactivates the first relay, thereby removing the first voltage from the control line.

33. The control circuit of claim 32, wherein the power source provides 110V.

34. The control circuit of claim 32, wherein the dc chopper module provides a pulse width modulated voltage.

35. The control circuit of claim 32 further comprising first, second and third resistors coupled between a ground and the first, second, and third relays, respectively.

36. The control circuit of claim 32 further comprising a slow blow fuse coupled between the second relay and a ground.

37. The control circuit of claim 32, wherein the dc chopper module is coupled through a fuse to the power source.

38. The control circuit of claim 32 further comprising a switch for arming the first relay and the dc chopper module, wherein the dc chopper module is coupled to the switch through a fuse.

39. The control circuit of claim 32 further comprising first and second free-wheeling diodes coupled to the first and second relays, respectively, for preventing voltage spikes.

40. The control circuit of claim 32, wherein the relays are solid-state relays.

41. The control circuit of claim 32, wherein the second voltage is approximately 50V.

* * * * *